March 29, 1966 H. M. AIKEN 3,243,108

ELASTIC LOGIC ELEMENT

Filed May 15, 1964 2 Sheets-Sheet 1

INVENTOR.

*Howard H. Aiken.*

BY

*Harness, Dickey & Pierce*

ATTORNEYS.

INVENTOR.
Howard H. Aiken.
BY
Harness, Dickey & Pierce
ATTORNEYS.

3,243,108
ELASTIC LOGIC ELEMENT

Howard H. Aiken, Fort Lauderdale, Fla., assignor to Mechanical Products, Inc., Jackson, Mich., a corporation of Delaware Filed May 15, 1964, Ser. No. 367,831
3 Claims. (Cl. 235—61)

This invention relates generally to logic elements and more particularly to an elastic logic element.

The advent of large scale digital computers has stimulated research into and the continuing improvement of logic elements, for example, diodes, transistors, magnetic cores and hydraulic logic devices. While the foregoing logic devices have proved to be satisfactory in many applications, a need has developed for a logic element that is concomitantly operable through a relatively wide temperature range, is radiation resistant, is of simple construction, exhibits a memory without requiring standby power, is relatively inexpensive, and is capable of solving complex logical operations. Logic elements heretofore known and used often exhibit one or more of the foregoing characteristics but no heretofore known element satisfies all of these requirements.

The herein disclosed logic element embraces a totally new concept of stressed members. In its simplest form, the logic element of the instant invention comprises a flat sheet of elastic material, for example, sheet metal, having a plurality of cooperating non-developable or compound curved surfaces therein which hereinafter will be termed dimples. Depending upon the characteristics of the material and the configuration and orientation of the dimples, the logic element may have one or more stable states with zero external force applied. Since the logic element of the instant invention is dependent upon the elastic properties of materials, its characteristics will be as stable as the properties of the material employed. Thus since materials are available that are radiation resistant and capable of operating over a wide temperature range, it is possible to construct elastic logic elements that are radiation resistant and capable of operation over a wide temperature range.

One major feature of the elastic logic element of the instant invention is that by proper orientation of the dimples, for example, by overlapping two or more dimples and controlling their sizes and relative position, it is possible to perform complex logic operations from a relatively simple input. Possible inputs to the logic element are mechanical actuating rods, air or hydrostatic pressure, acceleration, magnetic, electromagnetic, piezoelectric, magnetostrictive, or thermoelectric. Yet another input to the elastic logic element is heat since the elastic logic element may be formed from bimetallic material rendering the element directly heat sensitive.

Fundamentally, the elastic logic element of the instant invention is a mechanical device or, in other words, the output thereof is essentially mechanical. Therefore, the output characteristics of the elastic logic element can be utilized to operate, for example, contacts to make or break an electrical circuit, mechanical linkages, optical systems by means of moving mirrors which deflect a light beam, optical systems which utilize a shutter arrangement, transducers, or variable capacitors or resistors.

Accordingly, one object of the instant invention is a logic element that utilizes the elastic properties of stressed materials for its operation.

Another object is an elastic logic element that is actuated by relatively simple inputs, e.g. mechanical, electrical, or pressure, heat, etc.

Another object is an elastic logic element that has a mechanical output.

Other objects and advantages of the instant invention will be apparent from the following specification, claims and drawings, wherein:

The elastic logic element of the instant invention can best be explained by correlating it with known electrical and mechanical phenomena. For example, as shown diagrammatically in FIGURE 1 of the drawings, a simple elastic element 10 comprises a sheet of material, for example, spring bronze, having an annular planar portion 11 with a centrally disposed non-developable or compound curved surface hereinafter referred to as a dimple 12 therein. When the planar portion 11 thereof is supported and a force $f$ is applied to the dimple 12, the dimple 12 is capable of snapping through the plane of the portion 11 to the dotted line position. This snap-acting phenomenon is well known and is employed in a number of mechanical and electro-mechanical devices.

Figure 2:
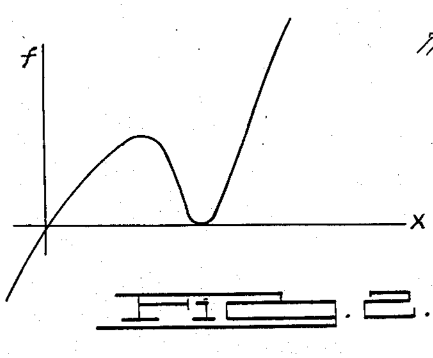
FIG. 2 is a graph of force vs. displacement of the logic element of FIG. 1.
Figure 1:
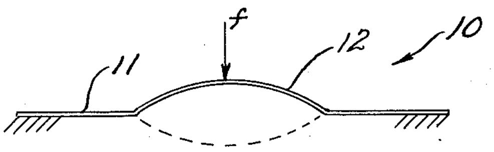
FIGURE 1 is a diagrammatic representation of a logic element in accordance with the instant invention.

As seen in FIG. 2, the "force-displacement" diagram for the simple elastic element 10 of FIG. 1 shows that displacement $x$ increases substantially linearly with force $f$ in accordance with Hooke's Law until the dimple 12 "snaps" at which time energy is released. Snap action of the dimple 12 is accompanied by the release of energy until the dimple 12 reaches a stable condition at which time an increase in applied force $f$ is required to effect further deformation.

Figure 3:
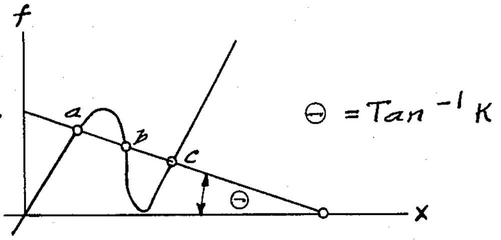
FIG. 3 is a graph of force vs. displacement similar to FIG. 2 with a linear spring supplying the force $f$.

Referring now to FIG. 3 of the drawings, there is shown a graph of force vs. displacement when the physical situation is changed by coupling a linear spring to the dimple 12 such that it has three equilibrium points $a$, $b$ and $c$, points $a$ and $c$ being stable and point $b$ being unstable. An equation representative of this situation is $\theta=\text{Tan}^{-1} K$ where K is the constant of the linear spring.

By applying the force $f$ to the dimple and depending upon which state the dimple is in and whether the applied force is plus (+) or minus (−), it is possible to shift from stable point $a$ to stable point $c$ or vice versa.

Figure 4:
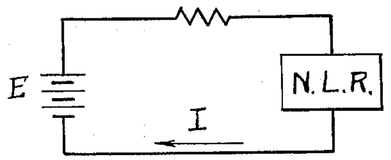
FIG. 4 is an electrical circuit analogous to the elastic logic element.

As seen in FIG. 4 an electrical circuit analogous to the spring biased dimple comprises a non-linear resistance N, a series resistance R, and an applied potential E.

Figure 5:
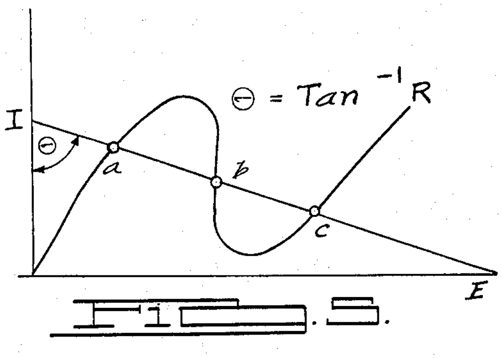
FIG. 5 is a graph of current vs. voltage of the circuit of FIG. 4.

As seen in FIG. 5, the volt-ampere characteristics of the circuit of FIG. 4 can be expressed by the equation $\theta=\text{Tan}^{-1} R$.

Figure 7:
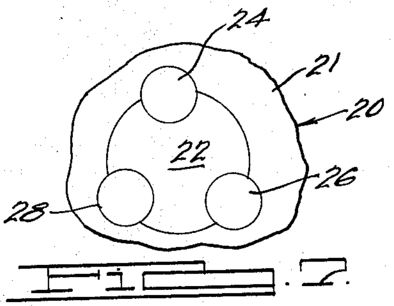
FIG. 7 is a view taken in the direction of the arrow 7 of FIG. 6.

Thus, from an examination of FIGS. 5 and 7 it should be apparent that the properties of prestressed dimples in elastic membranes can be examined from the point of view of electrical circuit design. In other words, the region of negative slope from $a$ to $c$ in FIG. 3, representative of the elastic device 10 is comparable to the region of negative slope from $a$ to $c$ in FIG. 7 which is representative of an electrical circuit that functions as a bi-stable trigger with an intermediate position of unstable equilibrium $b$.

Figure 6:
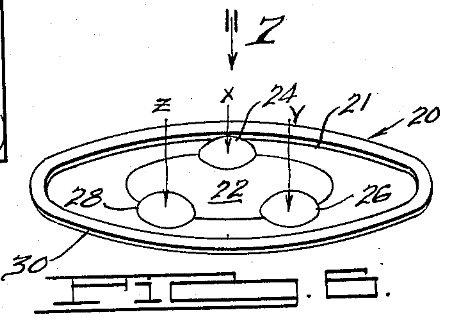
FIG. 6 is a perspective view of a logic element in accordance with the instant invention.

Referring now to FIGS. 6 and 7 of the drawings an elastic logic element 20, in accordance with an exemplary constructed embodiment of the instant invention, comprises an annular substantially flat portion 21, a central non-developable surface or truncated spherical dimple 22 and a plurality of satellite dimples 24, 26 and 28. The satellite dimples 24, 26 and 28 overlie the periphery of the center dimple 22, or in other words, extend across the juncture between the dimple 22 and the flat portion 21 of the logic element 20. The elastic logic element 20 also has an annular stepped rim 30 about the portion 21 thereof to facilitate retention in a suitable fixture, as will be described. The dimples 24, 26 and 28 can be designed to snap from a first stable state to a second stable state. Snap action of the central dimple 22 can be made to be dependent upon snap action of any one of the dimples 24, 26 and 28, or any combination thereof. If reversibility is required the dimples 24, 26 and 28 or any combination thereof, can be made to effect deflection of the dimple 22 without the dimples 24, 26 and 28 snapping through. Depression of one satellite dimple does not ordinarily effect deflection of the other satellite dimples. However, reversibility of the logic function in the form of the central dimple 22 effecting deflection of the satellite dimples 24, 26 and 28 can be achieved.

If the letters $x$, $y$, and $z$ are representative of discreet forces that are either less or more than the critical forces necessary to deflect the satellite dimples 24, 26 and 28, and if the satellite dimples 24, 26 and 28 bear a predetermined relationship to the relatively large dimple 22, the large dimple 22 can be made to deflect when any one (1), two (2), or three (3) of the satellite dimples 24, 26 and 28 are depressed. Logically, these three situations can be expressed by the Boolean expressions:

$$f_1\ (x, y, z)=(x) \text{ and/or } (y) \text{ and/or } (z)$$

$$f_2\ (x, y, z)=(x \text{ and } y)/\text{or } (x \text{ and } z)/\text{or } (y \text{ and } z)$$

$$f_3\ (x, y, x)=x \text{ and } y \text{ and } z$$

Figure 8:
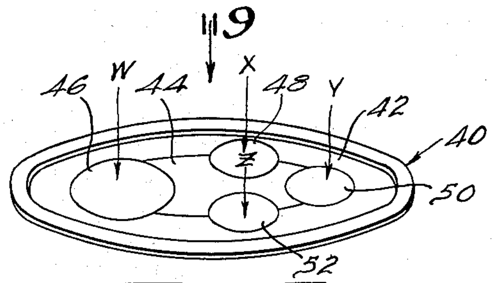
FIG. 8 is a perspective view similar to FIG. 6 showing another embodiment of the instant invention.
Figure 9:
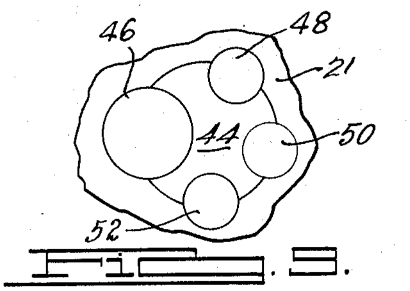
FIG. 9 is a view taken in the direction of the arrow 9 of FIG. 8.

All three of the foregoing expressions may be termed "threshold" functions that can be utilized to perform logic., Referring now to FIG. 8 of the drawings another embodiment of the instant invention comprises an elastic logic element 40 having a generally flat portion 42 with a central dimple 44. A plurality of satellite dimples 46, 48, 5o and 52 are spaced along the periphery of the center dimple 44. It is to be noted that the dimple 46 is relatively larger than the dimples 48, 50 and 52. Therefore, if the letters, $w$, $x$, $y$, and $z$ are representative of discreet forces either less or more than the critical forces necessary to deflect the dimples 46, 48, 50 and 52 the large dimple 44 can be made to deflect in accordance with the function $$(f)\ (w, x, y, z)=(w) \text{ and/or } (x) \text{ and } (y) \text{ and } (z)$$

In other words the dimple 46 effects a larger measure of control over the central dimple 44.

From the foregoing discussion it should be apparent that not only can a substantial number of input variables be handled by the logic element of the instant invention, but, by varying the size and orientation of the satellite dimplesh, relatively complex Boolean functions can be solved. The logic element is capable of utilizing a number of different input forces, for example, pushrods, hydrostatic pressures, magnetic forces when ferrous membranes are used and thermal forces developed in bimetals.

Figure 10:
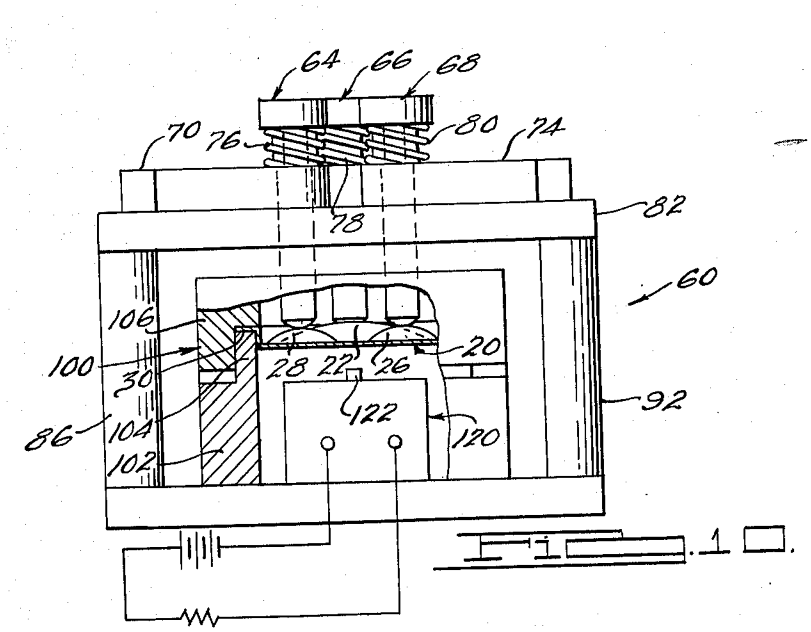
FIG. 10 is a side elevational view, partially broken away, of the elastic logic element of the instant invention mounted in a complementary fixture.
Figure 11:
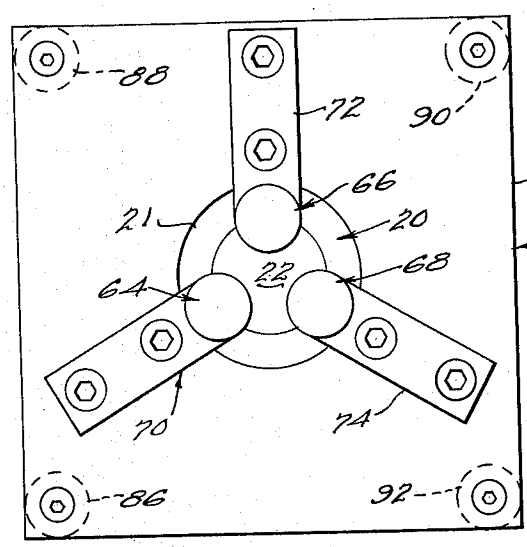
FIG. 11 is a top plan view of the fixture of FIGURE 1.

Referring now to FIGS. 10 and 11 of the drawings the elastic logic element 20 is shown mounted in a fixture 60 so as to utilize plunger inputs. The fixture 60 has a plurality of slidably mounted plungers 64, 66 and 68 that effect mechanical inputs to the dimples 28, 24 and 26 of the logic element 20, respectively. The plungers 64, 66 and 68 are slidably mounted in a plurality of bearing brackets 70, 72 and 74, respectively, and are normally biased upwardly as seen in FIGURE 1 of the drawings as by a plurality of springs 76, 78 and 80, respectively. The bearing brackets 70, 72 and 74 are mounted on an upper fixture plate 82 which is maintained in spaced parallel relationship to a lower fixture plate 84 as by a plurality of posts 86, 88, 90 and 92. The plungers 64, 66 and 68 pass through a central aperture 94 in the upper plate 82 to contact the dimples 28, 24 and 26, respectively.

The logic element 20 is supported on a complementary mounting pad 100 comprising a circular base portion 102 with an annular upstanding flange 104 thereon. The flange 104 supports the peripheral flange 30 of the logic element 20. Complementary annular cap 106 overlies the flange 30 on the element 20 to rigidly support the periphery of the element 20.

A switch 120, having a switch actuator 122 underlies the center dimple 22 of the logic device 20 so as to be actuated thereby upon deflection of the center dimple 22 in accordance with the aforesaid Boolean expressions. The dimples 22 as well as the dimples 24, 26 and 28 snap back to the condition shown in FIG. 10 upon release of the downward bias on the plungers 64, 66 and 68. The switch 120 can be utilized to close an electrical circuit to effect any desired electrical operation.

From the foregoing description it should be apparent that an elastic logic element in accordance with the instant invention, is capable of handling various inputs so as to exhibit a mechanical output. The output is achieved by deflection of a dimple formed in the logic element, the dimple deflecting upon deflection of a predetermined number of what may be termed "satellite dimples." The size and orientation of the satellite dimples relative to the main dimple dictates the input required to effect deflection of the main dimple. Thus, the elastic element is capable of performing logic.

It is to be understood that the improved construction of the elastic logic device herein disclosed and described is presented for the purpose of explanation and illustration and is not intended to indicate limits of the invention, the scope of which is defined by the following claims.

What is claimed is:

1. An elastic logic element comprising a relatively thin metallic member having a flat portion, a truncated generally spherical surface in said member, and a second truncated generally spherical surface overlying the juncture of said first surface with said flat portion, deflection of said second surface effecting deflection of said first surface.

2. An elastic logic element comprising a relatively thin metallic member having a flat portion, a truncated generally spherical surface in said member surrounded by the flat portion thereof, and second and third truncated generally spherical surfaces overlying the juncture of said first surface with said flat portion, deflection of both of said second and third surfaces effecting deflection of said first surface.

3. An elastic logic element comprising a relatively thin flat metallic member having a truncated generally spherical surface therein, said element having a flat portion completely surrounding said spherical surface, and a pair of truncated generally spherical surfaces overlying the juncture of said first surface with said flat portion, deflection of either one of said pair of spherical surfaces effecting deflection of said first surface.

(References on following page)

References Cited by the Examiner

UNITED STATES PATENTS

| | | | |
|---|---|---|---|
| 1,668,974 | 5/1928 | Mottlau | 267—1 |
| 1,883,249 | 10/1932 | Spencer | 267—1 |
| 1,895,591 | 1/1933 | Spencer | 267—1 |
| 2,355,951 | 8/1944 | Coffeen | 267—1 |
| 2,487,684 | 11/1949 | Smith | 267—1 |
| 2,571,170 | 10/1951 | Stilwell | 267—1 |
| 2,658,972 | 11/1953 | Brown | 235—201 |
| 2,860,208 | 11/1958 | Epstein | 267—1 |

FOREIGN PATENTS

| | | |
|---|---|---|
| 1,157,462 | 5/1958 | France. |

OTHER REFERENCES

IBM Technical Disclosure Bulletin, volume 6, No. 11, page 34, April 1964.

LEO SMILOW, *Primary Examiner.*

T. J. ANDERSON, *Assistant Examiner.*